US008645910B2

(12) United States Patent
Togawa

(10) Patent No.: US 8,645,910 B2
(45) Date of Patent: Feb. 4, 2014

(54) COMPILER CAPABLE OF PARTITIONING PROGRAM AND PROGRAM PARTITIONING METHOD

(75) Inventor: Atsushi Togawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1132 days.

(21) Appl. No.: 12/391,367

(22) Filed: Feb. 24, 2009

(65) Prior Publication Data

US 2009/0222791 A1 Sep. 3, 2009

(30) Foreign Application Priority Data

Feb. 29, 2008 (JP) .................................. 2008-049302

(51) Int. Cl.
*G06F 9/44* (2006.01)
(52) U.S. Cl.
USPC .......................................... 717/106; 717/109
(58) Field of Classification Search
USPC .......................................... 717/159, 106–109
See application file for complete search history.

(56) References Cited

U.S. PATENT DOCUMENTS

| | | | | |
|---|---|---|---|---|
| 5,937,191 | A * | 8/1999 | Graham | 717/130 |
| 7,343,482 | B2 * | 3/2008 | Biles et al. | 712/242 |
| 7,673,295 | B1 * | 3/2010 | Lin | 717/156 |
| 2006/0053416 | A1 * | 3/2006 | Watanabe | 717/151 |
| 2006/0112377 | A1 * | 5/2006 | Nacul et al. | 717/140 |
| 2006/0123404 | A1 * | 6/2006 | O'Brien et al. | 717/140 |

FOREIGN PATENT DOCUMENTS

| | | |
|---|---|---|
| JP | 11-149381 A | 6/1999 |
| JP | 2001-356916 A | 12/2001 |
| JP | 2005-266997 A | 9/2005 |
| WO | 2007-105309 | 9/2007 |

OTHER PUBLICATIONS

Japanese Office Action for corresponding Japanese Patent Application No. 2008-049302, dated Oct. 2, 2012.

Eiji Tanaka, Tsuneo Nakanishi, Kazuki Joe, and Masafumi Yamashita, "Implementation of a Parallelizing Compiler with a Universal Intermediate Representations," Technical Report in Information Processing Society of Japan, Japan: Information Processing Society of Japan, vol. 98, No. 7, pp. 21-23, 98-PRO-17-4, (Jan. 23, 1998) (See second paragraph of p. 3 of the JP Office Action dated Oct. 2, 2012 for relevancy).

* cited by examiner

*Primary Examiner* — Anna Deng
*Assistant Examiner* — Brahim Bourzik
(74) *Attorney, Agent, or Firm* — Matthew B. Dernier, Esq.

(57) ABSTRACT

A program stored in a memory is read, and in a path representing the order of processing instruction sequences forming the program, a subgraph including a sequence of instructions that includes only one instruction at the entry and only one instruction at the exit is identified. At least a part of a source instruction sequence included in the subgraph is extracted as a new program block and stored in a memory. An instruction for calling the instruction sequence in the new program block is inserted in a program block including the source instruction sequence. The program block including the source instruction sequence is then stored in the memory.

7 Claims, 14 Drawing Sheets

COMPILER CAPABLE OF PARTITIONING PROGRAM AND PROGRAM PARTITIONING METHOD

BACKGROUND OF THE INVENTION

1. Field of the Invention

The present invention relates to information processing technology and, more particularly, to a compiler of a program and a program partitioning method used in the compiler.

2. Description of the Related Art

The recent development of information processing technology allows a single information processing apparatus to perform a variety of functions by running software recorded in a recording medium such as a CD-ROM or software downloaded from a server on a network. In this background, efficient and high-speed execution of a program is always an important challenge.

For high-speed processing, it is not only necessary to improve the processing capability of a processor but also to improve the rate of data transfer between units in an information processing apparatus such as between processor units and between a processor and a memory. One of the technologies that allow a processor to access data or programs stored in a memory at a high speed is hierarchization of a memory using a cache memory. In general, a cache memory is a memory having a smaller capacity than a main memory and configured for high-speed access. By storing frequently accessed data in a cache memory, frequency of accesses to a main memory is reduced so that time required for data access is reduced as a whole. Some multiprocessor systems provided with a plurality of processors are also configured such that a local memory is provided for each processor to store data temporarily so that high-speed access to as much data as possible is enabled.

For a processor to execute a program at a high speed, it is also necessary to access machine codes at a high speed. Memories that allow high-speed access, i.e., high-speed memories, generally have a small capacity. As such, the entirety of a program may not be cached, i.e., stored in a high-speed memory, depending on the size of the program. In this case, a programmer needs to partition a program into a plurality of modules manually and write a program for caching the modules from a main memory to a high-speed memory at an appropriate point of time.

SUMMARY OF THE INVENTION

The present invention addresses the aforementioned challenges and its general purpose is to provide a technology for generating a program of a format suitable for caching without imposing a heavy load on a programmer.

One aspect of the present invention relates to a compiler. The compiler comprises: a partitioning unit operative to partition an input program into cache blocks having a size within a predetermined size limit; and a code generator operative to generate an object code for each cache block, wherein the partitioning unit comprises: a subgraph detector operative to identify, in a path representing the order of processing instruction sequences forming the program, a subgraph including a sequence of instructions that includes only one instruction at the entry and only one instruction at the exit; and an extractor operative to extract at least a part of a source instruction sequence included in the subgraph as a new cache block and insert, in a cache block including the source instruction sequence, an instruction for calling the instruction sequence in the new cache block.

Another aspect of the present invention relates to a program partitioning method. The program partitioning method comprises: reading a program stored in a memory, and identifying, in a path representing the order of processing instruction sequences forming the program, a subgraph including a sequence of instructions that includes only one instruction at the entry and only one instruction at the exit; extracting at least a part of a source instruction sequence included in the subgraph as a new program block and storing the extracted block in a memory; and inserting, in a program block including the source instruction sequence, an instruction for calling the instruction sequence in the new program block, and storing the program block including the source instruction sequence in the memory.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
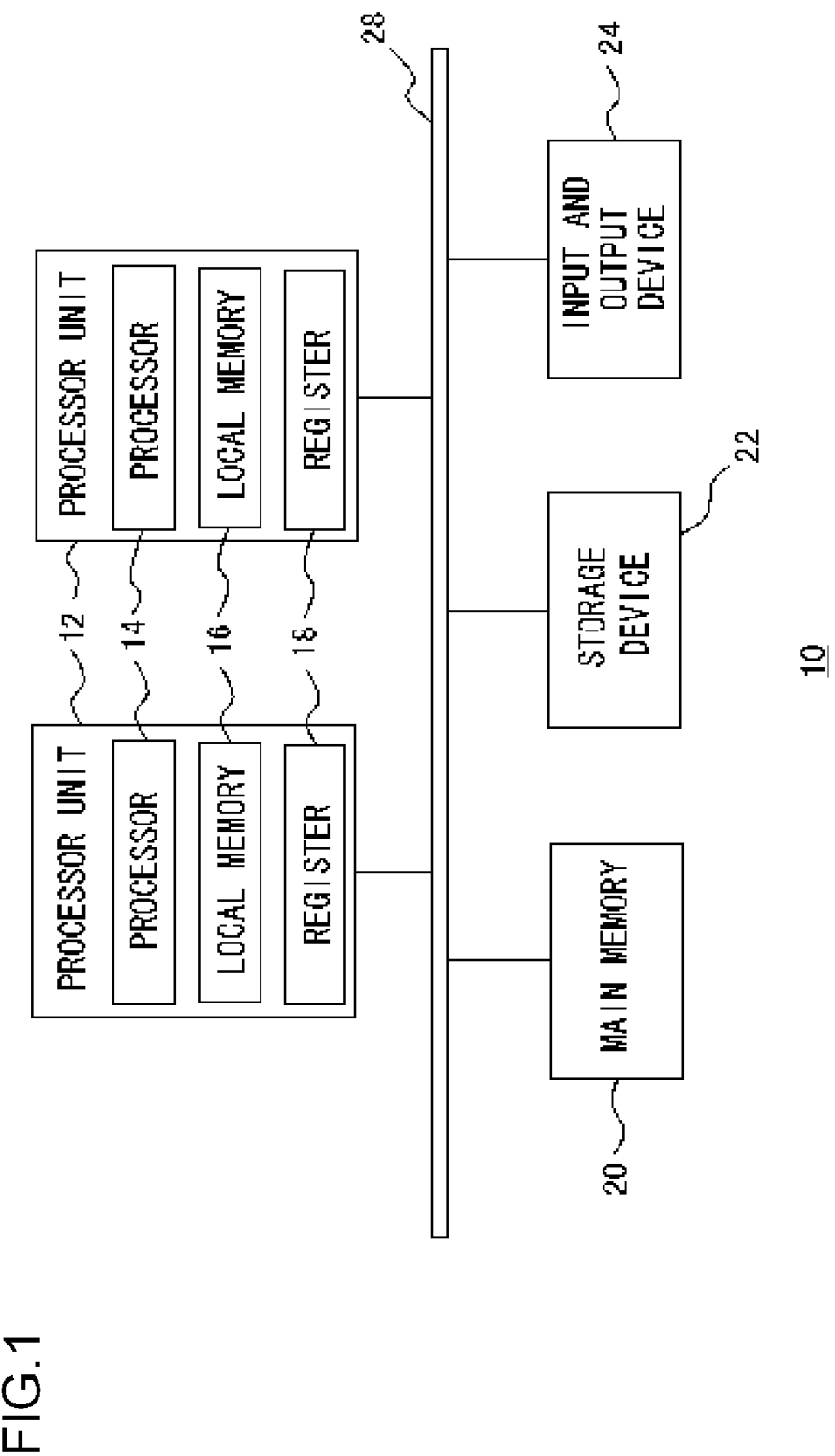
FIG. 1 shows an exemplary configuration of an information processing apparatus for executing a program generated according to the embodiment.

The invention will now be described by reference to the preferred embodiments. This does not intend to limit the scope of the present invention, but to exemplify the invention An embodiment of the present invention offers a technology for generating a program suitable for caching easily. The technology is implemented in the form of, for example, a compiler. A description will first be given of an example of apparatus for processing a program generated according to the embodiment. FIG. 1 shows an exemplary configuration of an information processing apparatus for executing a program generated according to the embodiment. The information processing apparatus 10 includes a processor 14, a local memory 16, a processor unit 12 including a register 18, a main memory 20, a storage device 22, and an input and output device 24. The components exchange data via a bus 28. The processor unit 12 may achieve data transfer by starting direct memory access (DMA) executed by a memory flow controller (MFC) connected thereto (not shown).

While the figure shows two processor units 12, one or more than two processor units may be provided. A plurality of processors 14 may be provided in the processor unit 12. The processors 14 may perform equivalent functions so as to execute a plurality of processes or threads in parallel. Alternatively, some processors 14 may perform specific functions like those of a graphics processor or an I/O processor.

The processor 14 of the processor unit 12 executes a program such as application software started by the user. The local memory 16 is implemented by, for example, a static random access memory (SRAM) allowing high-speed access and disposed on the same chip as the processor 14 or in the neighborhood thereof. The local memory 16 stores a part of the program loaded into the main memory 20, data necessary for processing, or data for processing results. The register 18 may be implemented by a temporary register for temporarily holding values necessary for processing in the processor 14. In this embodiment, the register 18 also stores data and stacks for managing the program stored in the local memory 16.

The main memory 20 is implemented by, for example, a dynamic random access memory (DRAM) and stores the entirety of the application program started by the user or a part thereof. In addition, the main memory 20 may function as a shared memory to enable data exchange between the plurality of processor units 12 or as a system memory for running the OS. The storage device 22 may be any of commonly used storage devices (e.g., a hard disk device, and a recording medium such as a CD-ROM and a reader, etc.) or a combination thereof. The storage device 22 stores programs, data necessary for processing, data that should be stored in the middle of a process or at the end of execution, etc. The input and output device 24 accepts a user input to direct the information processing apparatus 10 to, for example, start an application, and outputs processing results. The input and output device 24 may comprise an input device such as a keyboard, controller, and pointing device, and an output device such as a display device, speaker, and printer, or comprise a combination of the listed devices.

For information processing, the information processing apparatus 10 loads a program, etc., stored in the storage device 22 into the main memory 20. The apparatus 10 then caches a part of the program from the main memory 20 to the local memory 16 depending on the process executed by the processor unit 12. This eliminates the need for the processor 14 to access the main memory 12 at each step of the program execution. By limiting the access within the processor unit 12 as much as possible, the speed of software processing is increased. To achieve the above process in the related-art method, the program needs to be written such that it is partitioned into modules of a size that can be stored in the local memory 16.

Creation of a program allowing for caching in the local memory 16 may represent a load on a programmer especially in the case of a long and complex program providing advanced capabilities such as games and simulation software. The embodiment addresses this by allowing a compiler to automatically partition a program subject to compiling to a predetermined size or smaller. With this, a program of a format suitable for caching is generated without increasing the load on the programmer and the program thus generated can be referred to at a high speed. Hereinafter, each of partitioned programs generated by a compiler will be referred to as a "cache block".

Figure 2:
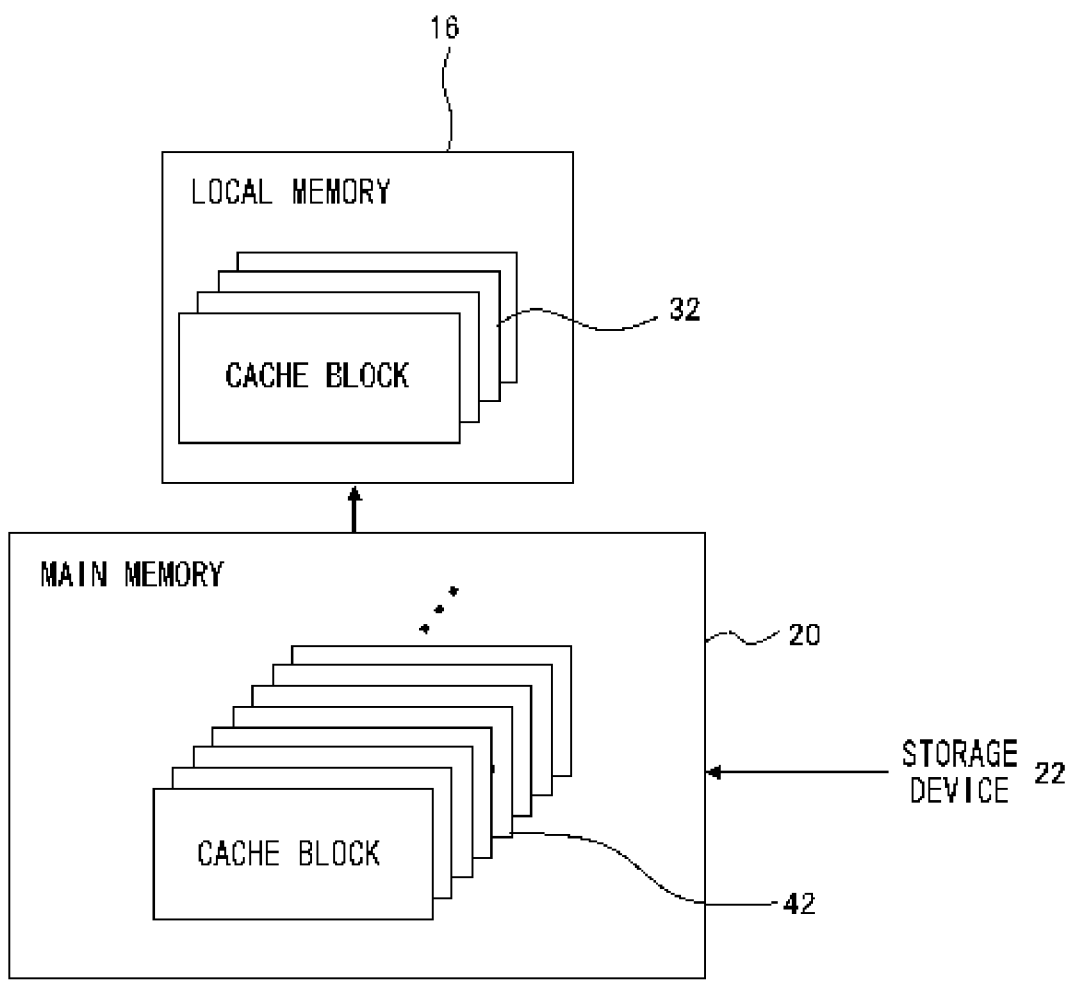
FIG. 2 schematically shows the structure of data stored in a local memory and a main memory in the information processing apparatus of FIG. 1.

FIG. 2 schematically shows a structure of data stored in the local memory 16 and the main memory 20. First, objects codes of a program compiled by a compiler according to the embodiment are loaded from the storage device 22 into the main memory 20. As mentioned above, the program is partitioned into cache blocks by the compiler so that a plurality of cache blocks 42 per a single software program are stored in the main memory 20, as shown in FIG. 2.

Of the plurality of cache blocks 42 stored in the main memory 20, blocks referred to in the processing by the processor 14 are cached in the local memory 16 in units of cache blocks and stored as cache blocks 32. Accordingly, it is required that the size of one cache block 42 do not exceed the capacity of a storage area in the local memory 16 for caching. The upper limit of the cache block 42 may be further determined by various factors including the method of caching and memory structure. Hereinafter, the upper limit of the size determined by the environment will be generically referred to as a "size limit of a cache block".

Since the cache blocks 42 and 32 are a part of a program, a need may arise to call a function in a cache block 32 in the middle of referring to another cache block for processing or to return to a function in the original cache block. If the cache block to be referred to is not located in the local memory 16, the target cache block 42 is identified in the main memory 20 and cached in the local memory 16.

Figure 3:
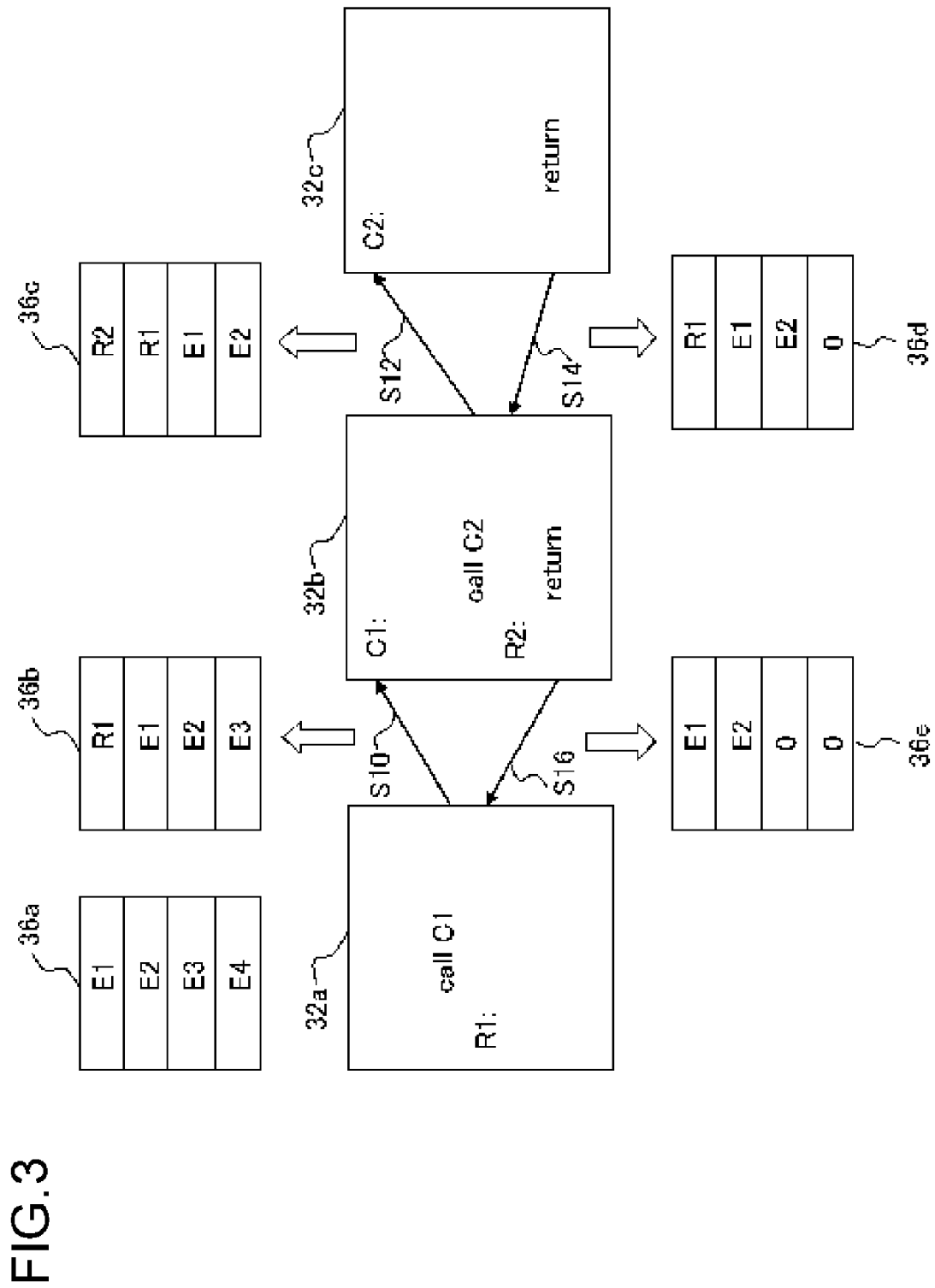
FIG. 3 shows an exemplary method for implementing a function call and a return process between cache blocks in the information processing apparatus of FIG. 1.

FIG. 3 shows an exemplary method for implementing a function call and a return process between cache blocks in the information processing apparatus 10. In this example, the return address of a cache block originating a function call is stored in a link stack when the call occurs so that, in a return from the function call, control is returned to the relevant location of the originating cache block by referring to the address. Referring to FIG. 3, link stacks 36a-36e represent a time-dependent change of a single link stack stored in the register 18. Cache blocks 32a-32c are sequentially referred to by function calls. It will be assumed that the cache block 32a, the cache block 32b, and the cache block 32c are referred to in the stated order.

The link stack 36a is assumed to represent an initial state. The return addresses "E4", "E3", "E2", and "E1" in the cache block (not shown) are stored in the stated order. When a process in the cache block 32a is executed and an instruction "call C1" is executed to call a function at an address "C1" in the cache block 32b (S10), the return address "R1" in the cache block 32a is placed in the link stack 36a (link stack 36b). When a process in the cache block 32b is then executed and an instruction "call C2" is executed to call a function at an address "C2" in the cache block 32c (S12), the return address "R2" in the cache block 32b is placed in the link stack 36b (link stack 36c).

When a process in the cache block 32c is then executed and an instruction "return" is executed to return control to the cache block 32b (S14), the link stack 36c is referred to so as to retrieve the return address "R2" on top of the stack. This results in the link stack 36d. Thus, when a process in the cache block 32b is executed and an instruction "return" is executed to return to the cache block 32a (S16), the return address "R1" is retrieved by referring to the top entry of the link stack 36d.

As shown in FIG. 3, the oldest entry is deleted when the capacity of the link stacks 36a-36e is consumed.

One concern is that, while a process in a given cache block cached in the local memory 16 is being executed, the return cache block may be overwritten by another cache block subsequently cached. This is addressed by substituting an invalid address for an entry of the address of the overwritten cache block in the link stacks 36a-36e. An invalid address is an arbitrary address at which no instructions are placed. For example, when the return cache block 32b is overwritten while a process in the cache block 32c is being executed, the top entry "R2" of the link stack 36c is substituted for by, for example, "0". This will indicate that the cache block 32b including the return address is overwritten.

In order to implement the above-described operation in the information processing apparatus 10, the embodiment provides for a method of automatically partitioning a program according to the following policy.
(1) The size of a cache block does not exceed a size limit and is sufficiently large at the same time.
(2) A sequence of instructions is extracted in a format suitable for use as a subroutine.

As regards (1), it is required that a cache block have a size cacheable in a given environment, as already discussed above. Meanwhile, it is also important that each cache block be not too small. If a program is partitioned into too small pieces and a large number of small-sized cache blocks are generated accordingly, the frequency of function calls or return processes across cache blocks is increased. This will produce overhead as a result. Therefore, it is desirable that the size of a cache block be increased as much as possible subject to the constraint of the size limit.

As regards (2), the phrase "the format suitable for use as subroutine" refers to a part in a sequence of instructions forming a function, that include a single entry and a single exit. By using a part extracted in a format suitable for use as a subroutine as a cache block, the process of calling an instruction included in the cache block or the process of returning to the originating cache block will not become complicated so that the system for call processes and return processes using the link stack shown in FIG. 3 is effectively used.

Figure 4:
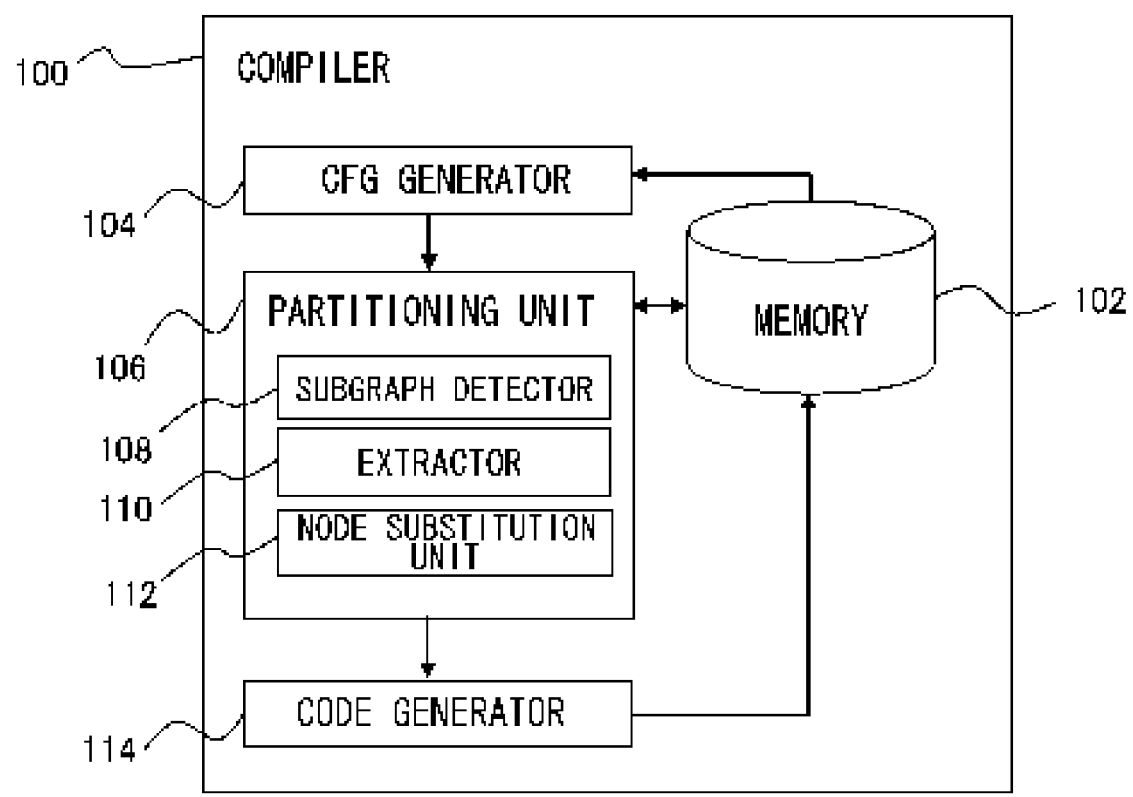
FIG. 4 shows the structure of a complier for compiling a program according to the embodiment.

FIG. 4 shows the structure of a complier for compiling a program run in the information processing apparatus. Referring to FIG. 4, the elements illustrated as functional blocks performing respective processes may be implemented in hardware by a CPU, memory, or other LSIs, and implemented in software by, for example, a program for performing various operations. Therefore, it will be obvious to those skilled in the art that the functional blocks may be implemented in a variety of manners by hardware only, software only, or a combination of thereof and not limited to one particular implementation. For example, the compiler 100 may be implemented by a part of the information processing apparatus 10 into which associated software is loaded.

The compiler 100 includes a CFG generator 104 for performing lexical analysis, etc., of a source code and generating a control flow graph (hereinafter, referred to as "CFG"), a partitioning unit 106 for partitioning a CFG, a code generator 114 for generating an object code corresponding to each of split CFGs and turning it into a cache block, and a memory 102 for storing data necessary for compiling and partitioning as well as storing the object code generated. The CFG generator 104 performs lexical analysis, parsing, etc., of a source code stored in the memory 102 and builds a CFG accordingly. It will be assumed that a process performed by an ordinary compiler to build a CFG is performed in adaptation to the language describing the source code. The CFG thus built is input to the partitioning unit 106.

The partitioning unit 106 includes a subgraph detector 108 for detecting a subgraph that can be extracted (described later), an extractor 110 for extracting a node for partitioning, a node substitution unit 112 for compiling a plurality of nodes into a single node. The partitioning unit 106 partitions a CFG input from the CFG generator 104 according to the policy described above as necessary. In this process, if an original function does not exceed the size limit, partitioning is not performed and the input CFG is output to the code generator 114 unmodified. When partitioning is performed, the CFG newly generated is stored in the memory 102 at each partitioning step as an output result. The code generator 114 reads the CFG thus stored. The code generator 114 generates an object code based on the CFG output by the partitioning unit 106. The object code comprises a block corresponding to the CFG and ultimately represents a cache block. The cache block thus generated is stored in the memory 102. The code generator 114 may perform a process performed by an ordinary compiler to build an object code in adaptation to the language describing the source code.

Figure 5:
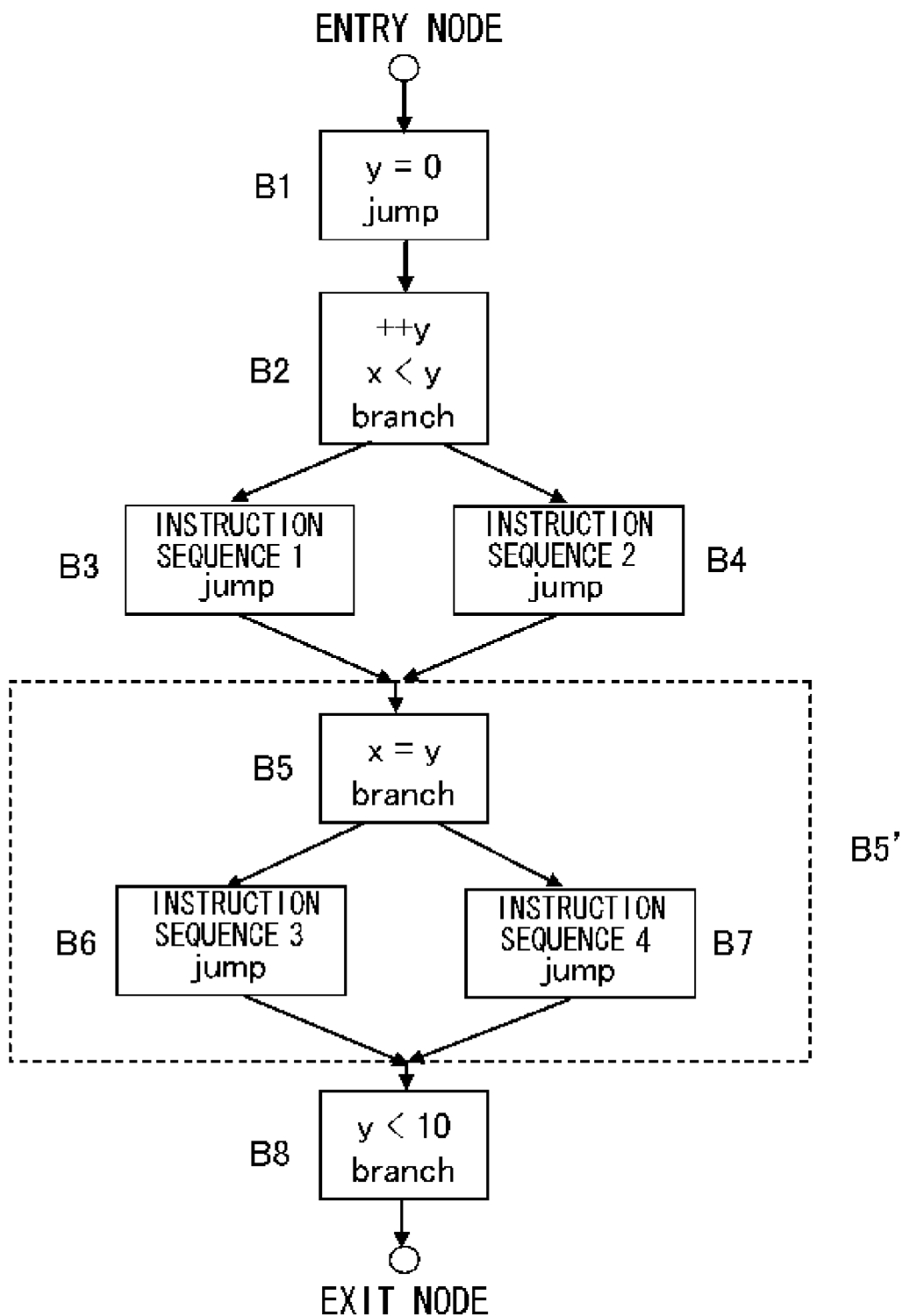
FIG. 5 shows an exemplary CFG generated according to the embodiment.

A description will now be given of a summary of CFG partitioning performed by the subgraph detector 108, the extractor 110, and the node substitution unit 112 of the partitioning unit 106. A CFG is a graph representing the control flow of a program. FIG. 5 shows an exemplary CFG generated according to the embodiment. The CFG as illustrated corresponds to the following program.

```
int foo(int x)
{
int y = 0;
do {
++y;
if (x < y) {instruction sequence} else {instruction
sequence}
if (x == y) {instruction sequence} else {instruction
sequence}
} while (y < 10);
}
```

A CFG is a representation of a transfer of control from one node to another, where a node represents a basic block. A basic block is defined as a sequence of instructions having no branch instructions except at the end thereof and having no entry points except at the beginning thereof. Referring to the CFG of FIG. 5, each of rectangular nodes B1-B8 represents a basic block. In practice, CFG data is presented by establishing correspondence between the identification numbers of nodes forming the CFG and data sequence such as the lists of identification numbers of basic blocks included in the nodes, dominators, identification numbers of previous nodes, and identification numbers of following nodes. The identification number of a basic block is separately associated with a sequence of instructions in the block.

A "previous node" is defined as a node at the tail of an arrow pointing to a target node, and a "following node" is defined as a node pointed to by an arrow from a target node. In the example of FIG. 5, the "previous nodes" for the node B5 are B3 and B4 and the "following nodes" for the node B5 are B6 and B7. A description of "dominator" will be given later. A skilled person would understand that the data structure of CFG described above is generally used in CFG.

For partitioning of an input CFG, the subgraph detector 108 of the partitioning unit 106 identifies a part comprising a sequence of instructions where there is only one entry node and only one exit node. Such a part is suitable for use as a subroutine of the policy (2) above and is suitably extracted as a cache block. Hereinafter, such a part will be referred to as an "extractable subgraph". In the example of FIG. 5, there are no paths leading to the node B6 or node B7 without passing through the node B5. Control once passing through the node B5 will reach the node B8 without exception. In other words, the node B5 is the only entry of a subgraph comprising the nodes B5, B6, and B7, and the node B8 is the only exit of the subgraph. Accordingly, the subgraph comprising the nodes B5, B6, and B7 is an extractable subgraph. The same is true of the subgraph comprising the nodes B2, B3, and B4.

The subgraph detector 108 identifies an atomic extractable subgraph that does not include any extractable subgraphs. For example, in the subgraph including the nodes B2, B3, B4, B5, B6, and B7, the node B2 is the only entry and the node B8 is the only exit. However, the subgraph is not an "atomic extractable subgraph" to be identified because the subgraph includes an extractable subgraph comprising the nodes B5, B6, and B7.

Extraction is performed as follows. A determination is made as to whether the size of an extractable subgraph identified by the subgraph detector 108 exceeds the size limit of a cache block predefined in the memory 102. If the size exceeds the limit, the extractor 110 extracts at least one of the nodes included in the subgraph and generates a CFG comprising the extracted node. In this process, a sequence of instructions for calling the newly generated CFG is inserted in the extracted node in the original CFG. It is assumed, in the example of FIG. 5, that the total size of the subgraph comprising the nodes B5, B6, and B7 exceeds the size limit of a cache block, and that the size will be below the limit if the sequence of instructions 3 is removed. In this case, the node B6 is extracted and a new CFG including only the "sequence of instructions 3" is generated. The sequence of instructions 3 in the node B6 in the CFG of FIG. 5 is replaced by a sequence of instructions for calling the newly generated CFG.

Thereafter, the node substitution unit 112 substitutes a single node for the entirety of the extractable subgraph identified. In the example of FIG. 5, the subgraph comprising the nodes B5, B6, and B7 is replaced by a single node comprising B5'. Compiling nodes into a single node may allow identification of an extractable subgraph that includes the compiled node. In this case, a process as described above is repeated as appropriate. Ultimately, it is ensured that the size of all CFGs is within the size limit.

As described above, a CFG is a structure having a data structure in which correspondence is established between the identification numbers of nodes forming the CFG and the lists of identification numbers of basic blocks included in the nodes, and information indicating the relative position of the node in the CFG. Therefore, when the extractor 110 extracts a node, the extractor 110 establishes, in the structure of the newly generated CFG, correspondence between the identification number of the extracted node and the list of identification numbers of basic blocks originally associated with the node. The extractor 110 also generates a basic block containing an instruction for calling the CFG thus generated, and substitutes the identification number of the basic block thus generated into the list of basic blocks in the extracted node in the original CFG. The node substitution unit 112 substitutes a single node for the extractable subgraph such that the node substitution unit 112 inserts the identification number of a new node in the original CFG and updates the information indicating the relative positions of the nodes so that the new node is included in its path. Further, the substitution unit 112 compiles the list of basic blocks in the nodes occurring before the substitution into a list of basic blocks in the new node. A more detailed description will be given later.

Figure 6:
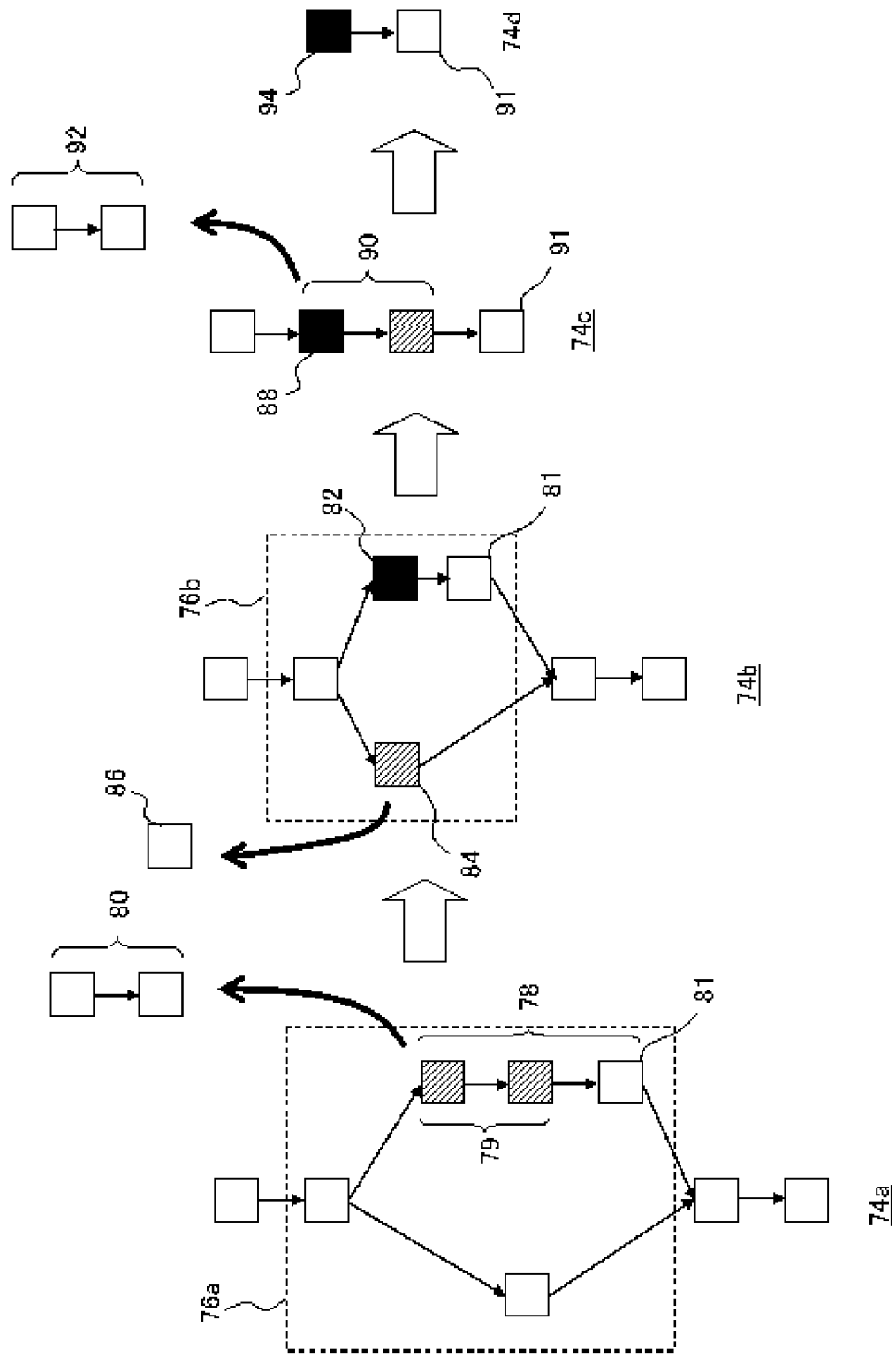
FIG. 6 schematically shows how a CFG is transformed as a partitioning process according to the embodiment proceeds.

A description will now be given of a summary of the partitioning process performed by the partitioning unit 106 outlined above. FIG. 6 schematically shows how a CFG is transformed as a partitioning process proceeds. For ease of understanding, the process is described, if necessary, as though the process is performed as it appears in the CFG. In practice, however, data associated with each other inside and outside the CFG are updated as described above. Referring to FIG. 6, four CFGs 74a, 74b, 74c, and 74d represent a time-dependent change of a single CFG in the stated order. The subgraph detector 108 identifies an extractable subgraph 76a in the CFG 74a. As described above, the subgraph detector 108 determines whether the size of the extractable subgraph 76a exceeds the size limit of a cache block. If the size exceeds the limit, the extractor 110 determines whether a linear sequence of nodes is included in the extractable subgraph 76a.

Referring to FIG. 6, a linear sequence of nodes 78 is included in the extractable subgraph 76a. In this case, the range of the linear sequence of nodes is identified first. If the total size of the range exceeds the size limit of a cache block, at least one node in the linear sequence is extracted so as to generate a new CFG. In this process, as many nodes as possible are extracted subject to the constraint of the size limit. In FIG. 6, a sequence of nodes 79 is extracted from the linear sequence of nodes 78 so as to generate a new CFG 80.

As indicated by the CFG 74b, the node substitution unit 112 then substitutes a single node 82 for the linear sequence of nodes 78 except for an exit node 81. The node 82 includes an instruction for calling the new CFG 80. When the size of the extractable subgraph 76b still exceeds the size limit of a cache block at this stage, the extractor 110 further extracts one of the nodes included in the extractable subgraph 76b so as to generate a new CFG. In FIG. 6, a node 84 is extracted so as to generate a new CFG 86. An instruction for calling the new CFG 86 is substituted into the original node 84.

If the size of the extractable subgraph 76b is within the size limit, the node substitution unit 112 substitutes a single node 88 for the extractable subgraph 76b, as indicated by the CFG 74c. The substitution unit 112 determines whether the total size of the CFG 74c exceeds the size limit of a cache block. If the size exceeds the limit, the extractor 110 further extracts at least one node. Since the CFG 74c as shown is a linear sequence of nodes, as many nodes as possible are extracted as in the case of a linear sequence of nodes within the extractable subgraph described above. FIG. 6 shows that a sequence of nodes 90 is extracted so as to generate a new CFG 92. The node substitution unit 112 substitutes a single node 94 for those of the nodes in the linear sequence except for an exit node 91. The node 94 includes an instruction for calling the new CFG 92.

By performing the above-described process, the CFG 74d which survived the extraction from the original CFG 74a, and the CFG 80, CFG 86, CFG 92 newly generated as a result of the extraction are output from the partitioning unit 106 as output results. In this embodiment, an extractable subgraph is first identified and nodes to be extracted are then determined. Therefore, even when a cache block is called while a program is being executed, it only calls for a process closed within the subgraph as in the case of a subroutine call. As a result, dependence between a source of a function call and a called function is clearly defined so that management of a call process and a return process is facilitated. Particularly, the link stack described with reference to FIG. 3 can be take advantage of effectively. By extracting a linear sequence of nodes in block, the process can be performed continuously by referring to the same cache block. Thereby, overhead resulting from frequent switching between cache blocks referred to is controlled.

Figure 7:
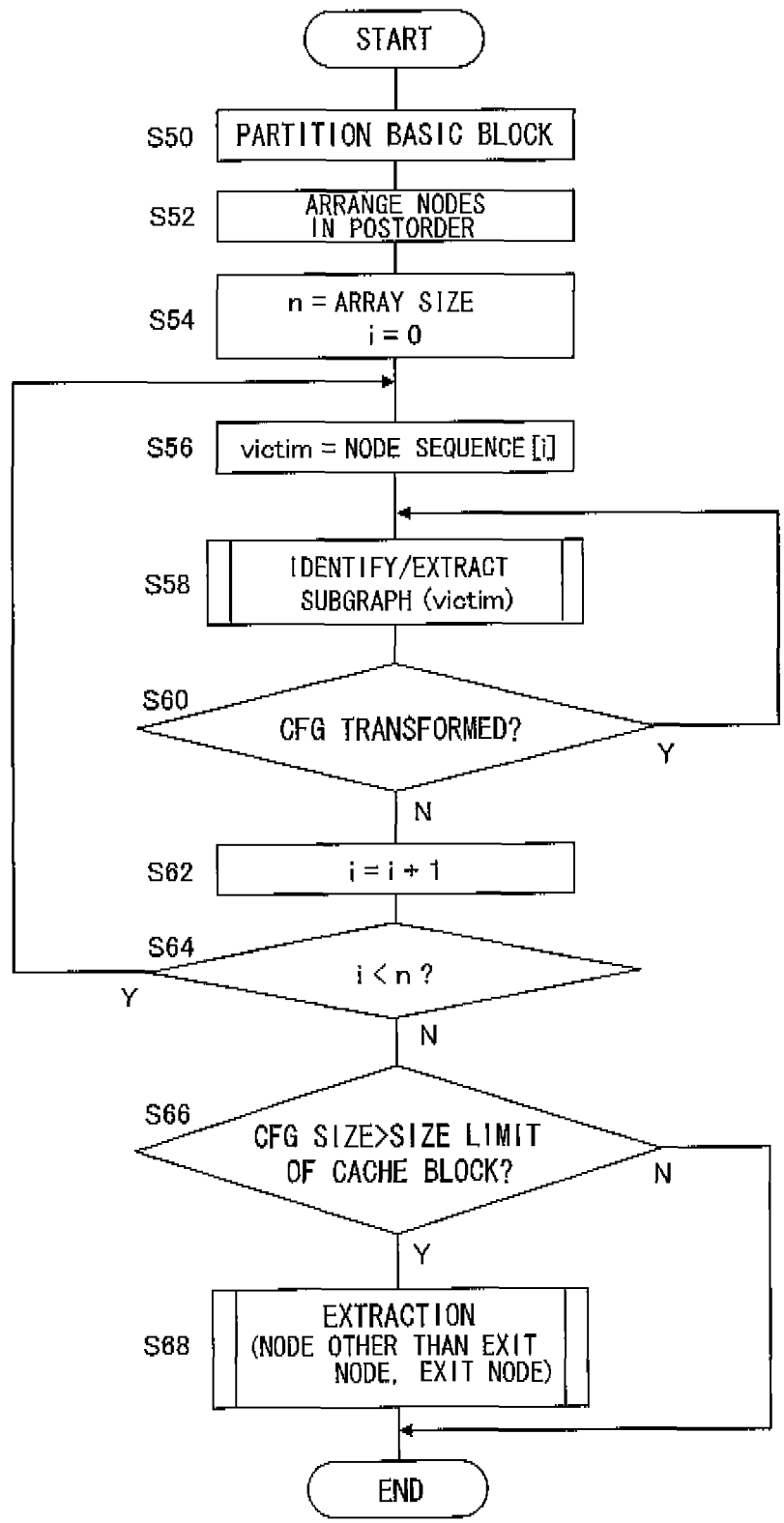
FIG. 7 is a flowchart showing a procedure for partitioning performed by the partitioning unit according to the embodiment.

A specific procedure for implementing the above-described method of partitioning a CFG will be described now. FIG. 7 is a flowchart showing a procedure for partitioning performed by the partitioning unit 106. First, the partitioning unit 106 identifies a basic block included in an input CFG and having a size that exceeds the size limit of a cache block. The unit 106 then splits the block into a plurality of blocks as appropriate (S50). The splitting should be performed avoiding a period while a valid value is substituted into a register that needs to be updated when calling a function, i.e., a period started when a value is substituted into the register and ended when the value is last referred to. Any of the methods proposed for lifetime analysis and used to acquire the period may be used. When a block is split, each of the blocks generated as a result represents a new node.

Figure 8:
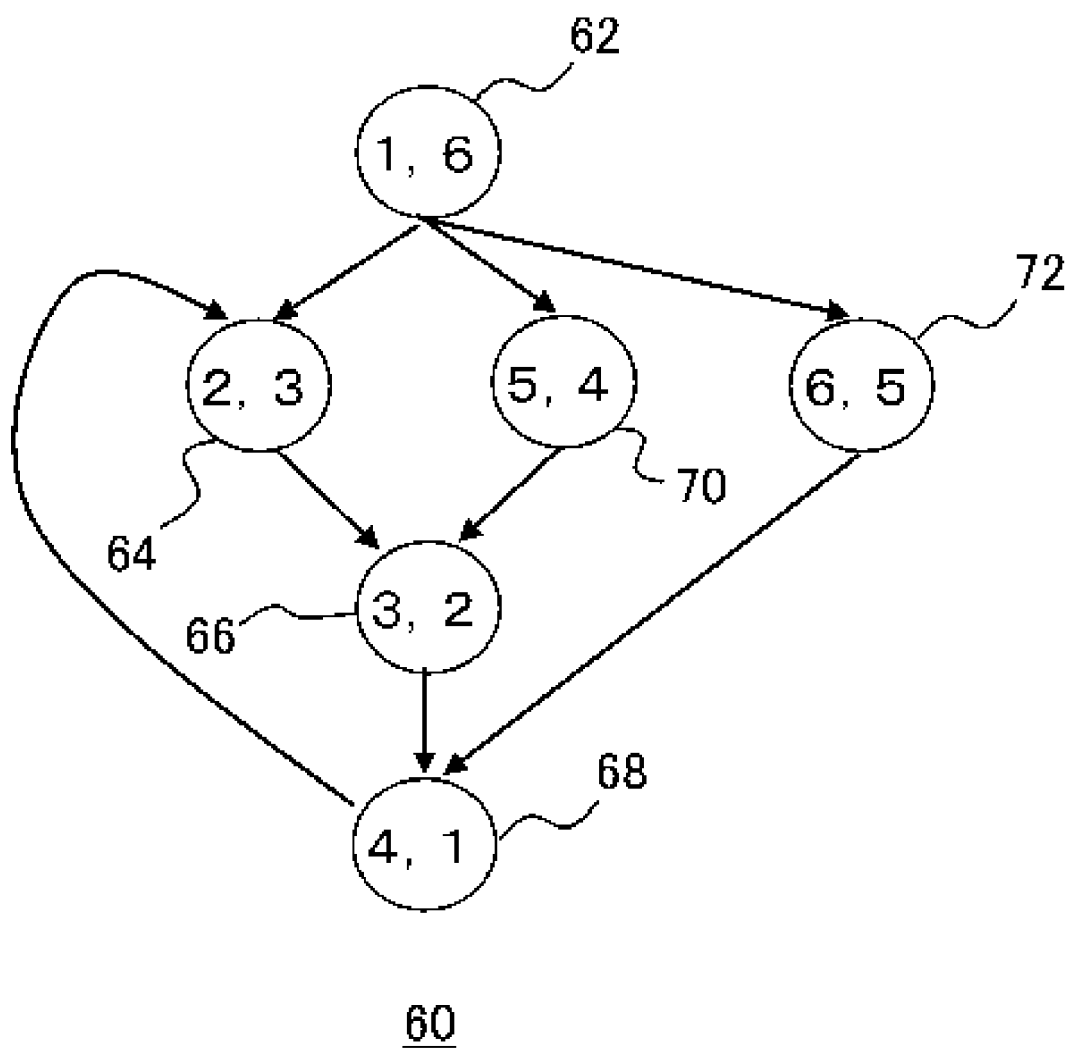
FIG. 8 is a diagram for explaining the postorder.

The nodes are then arranged in the postorder of the CFG (S52). The postorder is defined as a sequence of nodes where all of the succeeding nodes has been searched in a depth-first search in a graph. The depth-first search is a method of searching nodes such that the nodes are searched as far as away from the entry node as possible without visiting the same node a plurality of times. FIG. 8 illustrates the postorder. Referring to FIG. 8, the circles represent nodes 62, 64, 66, 68, 70, and 72 forming a CFG 60. The left numeral in the circle denotes the order of search and the right numeral denotes the postorder. In the case of the CFG 60 illustrated, the entry node is the node 62 and the search is conducted in the order the node 62, the node 64, the node 66, the node 68, and the node 70, and the node 72. Arranging the nodes in the postorder results in the order the node 68, the node 66, the node 64, the node 70, the node 72, and the node 62.

By identifying extractable subgraphs in the postorder, atomic subgraphs are identified. Referring back to FIG. 7, the size of an array, i.e., the number of nodes, is substituted into the variable n and an initial value 0 is substituted into the variable i (S54), whereupon identification of extractable subgraphs and extraction thereof as described above are started at the top of the node array (i=0). More specifically, the identification number of the target node is substituted into a variable victim (S56), and the function for identification and extraction is called using the variable victim as an argument (S58). Details of the function for identification and extraction will be given later. As described above in general terms, a determination is made as to whether there is an extractable subgraph with the node indicated by the variable victim as an entry node. If the subgraph is identified, a part of the subgraph is extracted as necessary so as to generate a new CFG, whereupon the subgraph is substituted for by a new node.

A determination is then made as to whether the CFG is transformed as a result of the identification and extraction of the extractable subgraph in S58 (S60). If it is determined that the CFG is transformed (Y in S60), there is a possibility that a new atomic extractable subgraph with the node indicated by the variable victim as an entry node is generated. In this case, such a subgraph is identified and extracted (S58). Steps S58 and S60 are repeated until the CFG is not transformed any more (N in S60), whereupon the variable i is incremented so that identification and extraction of an extractable subgraph with the next node in the node array as an entry node are performed (S62, Y in S64, S56, S58, S60).

When the above-described process is performed for all of the n nodes (N in S64), a determination is made as to whether the total size of the original CFG exceeds the size limit of a cache block (S66). If the size limit is exceeded (Y in S66), nodes are extracted at an appropriate location. More specifically, the function for extraction is called using the identification number of a node other than the exit node of the original CFG and the identification number of the exit node as arguments (S68). Details of the function for extraction will be given later. As a result of the above-described process, a set of CFGs each having a size not exceeding the size limit of a cache block is generated.

Figure 9:
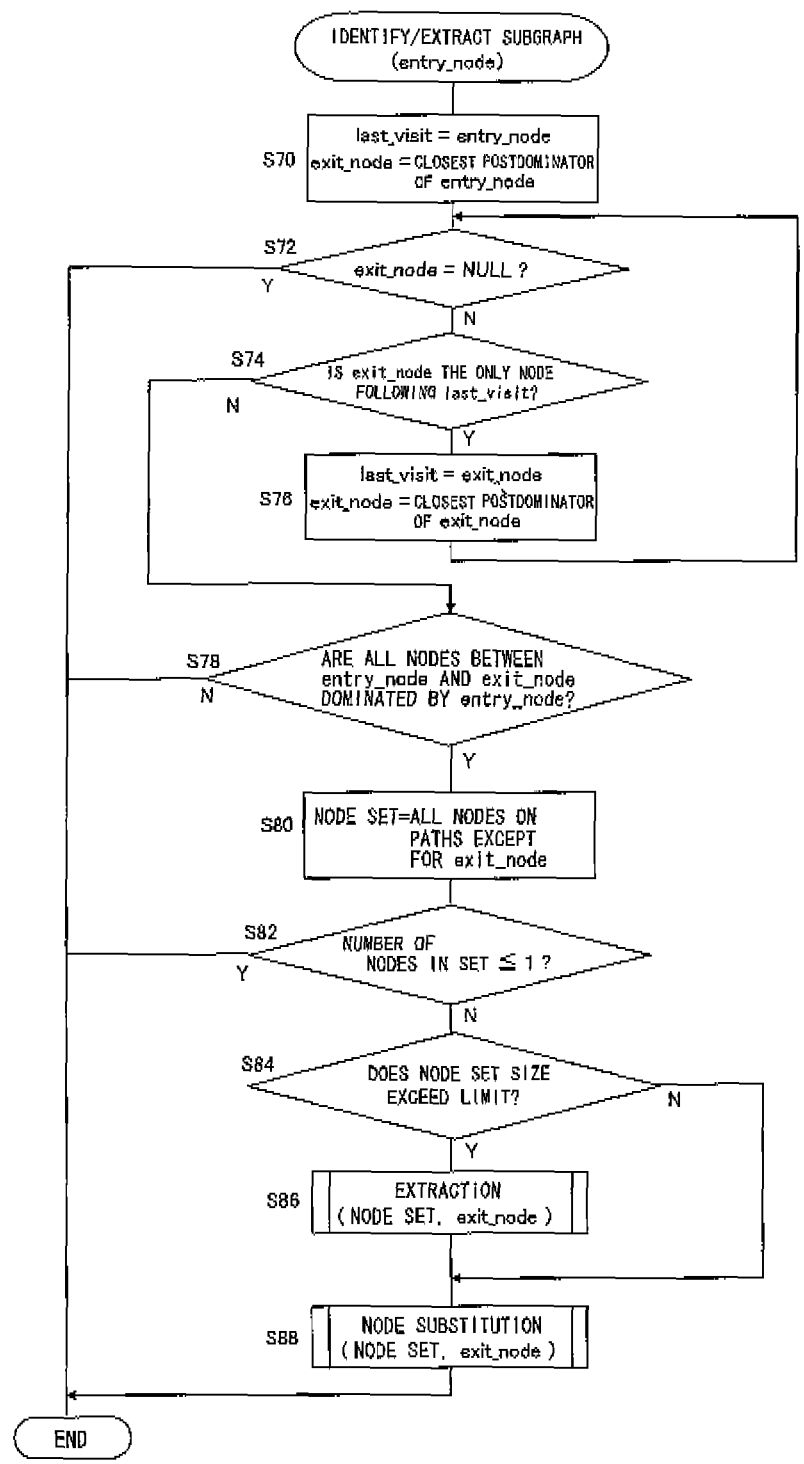
FIG. 9 is a flowchart showing a procedure of a function for subgraph identification and extraction according to the embodiment.

FIG. 9 shows a procedure of a function for subgraph identification and extraction called in S58 of FIG. 7. As described above, the function is adapted to identify an atomic extractable subgraph with the node designated by the argument as an entry, extract at least one node so that the total size of the identified subgraph does not exceed the size limit of a cache block so as to generate a new CFG, and substitute a new node for the extractable subgraph. The function is executed by the subgraph detector 108, the extractor 110, and the node substitution unit 112.

Given that the identification number of the node designated by the argument is represented by "entry_node", postdominators of the node indicated by entry_node are identified. Of those postdominators, the one not located on a linear path leading from the node represented by entry_node and closest to the node indicated by entry_node is then identified. The identification number of the node thus identified will be represented by "exit_node" (S70, N in S72, S74, S76).

When a node y is located on all paths leading from the entry node of a CFG to a node x, y is said to dominate x, or y is said to be a dominator of x. When a node y is located on all paths leading from a node x in a CFG to the exit node of the CFG, y is said to be a postdominator of x. When there are no paths leading from the node x to the exit node, nodes that can be reached from the node x are identified and the farthest of these nodes from the entry node of the CFG is then identified. The postdominator is determined by assuming that there is a path leading from the farthest node thus identified to the exit node of the CFG. Methods commonly used in CFG analysis may be used to search dominators and postdominators.

Specifically, determination of exit_node proceeds as follows. First, the value of the variable entry_node is substituted into a variable last_visit, and the identification number of the postdominator closest to the node indicated by last_visit is substituted into the variable exit_node (S70). When there are no nodes that can be substituted into the variable exit_node, it is determined that no extractable subgraphs are found so that the function for subgraph identification and extraction is exited (Y in S72).

If a node to be substituted into the variable exit_node is found (N in S72) and if the node indicated by the variable exit_node is the only node immediately following the node indicated by the variable last_visit (Y in S74), it means that the node indicated by the variable entry_node and the node indicated by the current variable exit_node are located on a linear path. Accordingly, the candidate for the variable exit_node is made closer to the exit by substituting the variable exit_node into the variable last_visit, and substituting the identification number of the postdominator closest to the node indicated by the previously occurring variable exit_node into the variable exit_node.

The loop is repeated such that a determination is made in S72 and S74, and, if the same result as above is yielded, step S76 is executed. If the number of nodes following the node indicated by the variable last_visit is not 1, or if the node immediately following the node indicated by the variable last_visit is no longer the node indicated the variable exit_node (N in S74), step S76 for updating the variable exit- _node is exited. In the presence of a node that is on a linear path leading from the node indicated by the variable entry_node, the above-described process causes the node indicated by the variable exit_node to be outside the reach of the linear path. Since the node indicated by the variable exit_node is a postdominator in this search without exception, the ultimate node indicated by the variable exit_node represents the only exit from the subgraph sought to be determined. Accordingly, the node is determines as the exit node of the extractable subgraph.

Subsequently, a determination is made as to whether, in each of the paths leading from the node indicated by the variable entry_node to the exit node as determined above without passing through the exit node, there is a node, other than the exit node, not dominated by the node indicated by the variable entry_node (S78). If all of the nodes other than the exit node are dominated by the node indicated by the variable entry_node (Y in S78), the dominating node represents the only entry to the subgraph sought to be identified. Therefore, the dominating node is determined to be the entry node of the extractable subgraph and the identification numbers of all nodes dominated are defined to form a "node set" array (S80). The nodes included in the extractable subgraph thus identified belong to the node set array.

Meanwhile, if there are any nodes not dominated by the node indicated by the variable entry_node in any of the paths, the node indicated by the variable entry_node does not represent the entry node. Therefore, it is determined that there are no extractable subgraphs with the node as an entry so that the function for subgraph identification and extraction is exited (N in S78). Further, if the number of nodes in the set is 1 or smaller, i.e., if there are no nodes forming an extractable subgraph other than the entry node, the step of substituting a new node for the target part is meaningless so that the function for subgraph identification and extraction is exited (Y in S82).

If the number of nodes in the set is 2 or greater (N in S82), a determination is made as to whether the total size of the nodes belonging to the node set exceeds the size limit of a cache block (S84). If the size limit is exceeded (Y in S84), the excess of the size limit is eliminated by calling the function for extracting nodes at an appropriate location, using the node set array and the identification number of the exit node as arguments (S86). If the size limit is not exceeded (N in S84), or if the excess is eliminated by an extraction process (S86), the function for node substitution is called so as to substitute a single node for the extractable subgraph (S88).

Figure 10:
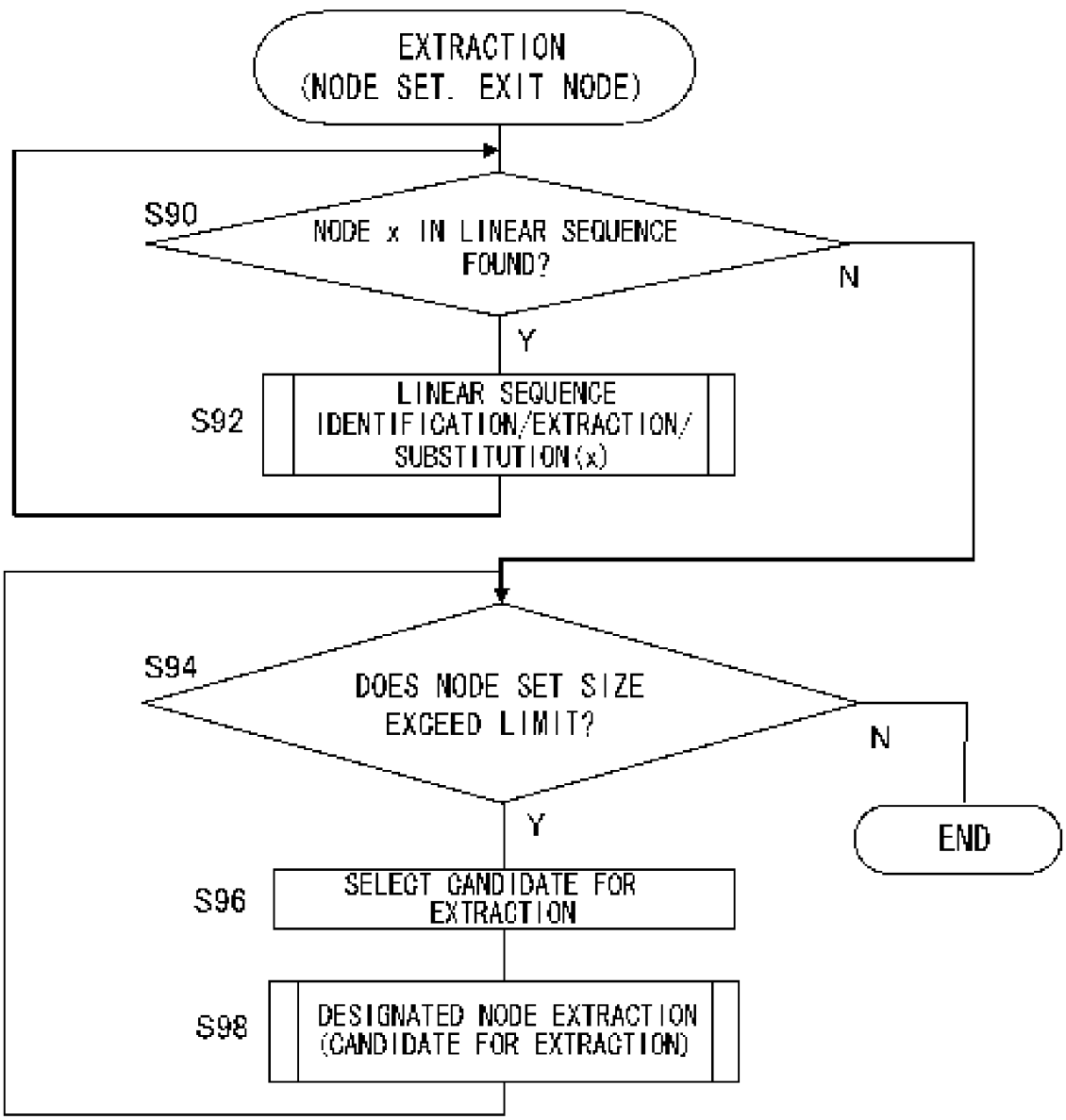
FIG. 10 is a flowchart showing a procedure of a function for node extraction according to the embodiment.

FIG. 10 shows a procedure of a function for node extraction called in S68 of FIG. 7 and S86 of FIG. 9. As described above, the function extracts at least one node so that the total size of the node set provided as an argument does not exceed the size limit and generates a new CFG. The function is executed by the extractor 110. A determination is made as to whether there is a linear node sequence in the designated node set (S90). In practice, the process is implemented by identifying a node x that meets all of the following conditions, (1) only one node precedes the node x, (2) only one node follows the node x, (3) only one node follows the preceding node, and (4) the node x is not the entry node or the exit node of the CFG.

If the node x is identified (Y in S90), the function for identification, extraction, and substitution of a linear sequence is called, using the identification number of the node x as an argument (S92). The function identifies a linear sequence of nodes, and, if the total size of the linear sequence exceeds the size limit, extracts at least a part of the sequence, generate a new CFG, and substitutes a single node for the sequence. Details of the function will be given later. The function is repeated until the linear sequence is no longer in the designated node set (Y in S90, S92). If the linear sequence is no longer in the node set (N in S90), a determination is made as to whether the total size of the node set exceeds the size limit of a cache block (S94). The total size of the node set, which is the argument, exceeds the size limit when the function for extraction is called. However, since a part of the linear sequence is extracted in S92 so that the total size may be reduced, a determination is made for a second time in S94.

If the total size falls within the size limit as a result of extraction of a linear sequence, the process is exited (N in S94). If the size limit is exceeded (Y in S94), one of the nodes (e.g., the node with the largest size) is selected from the node set (S96) and the function for designated node extraction is called, using the identification number of the node thus selected as an argument (S98). The function extracts the node designated by the argument and generates a new CFG. Details will follow.

Figure 11:
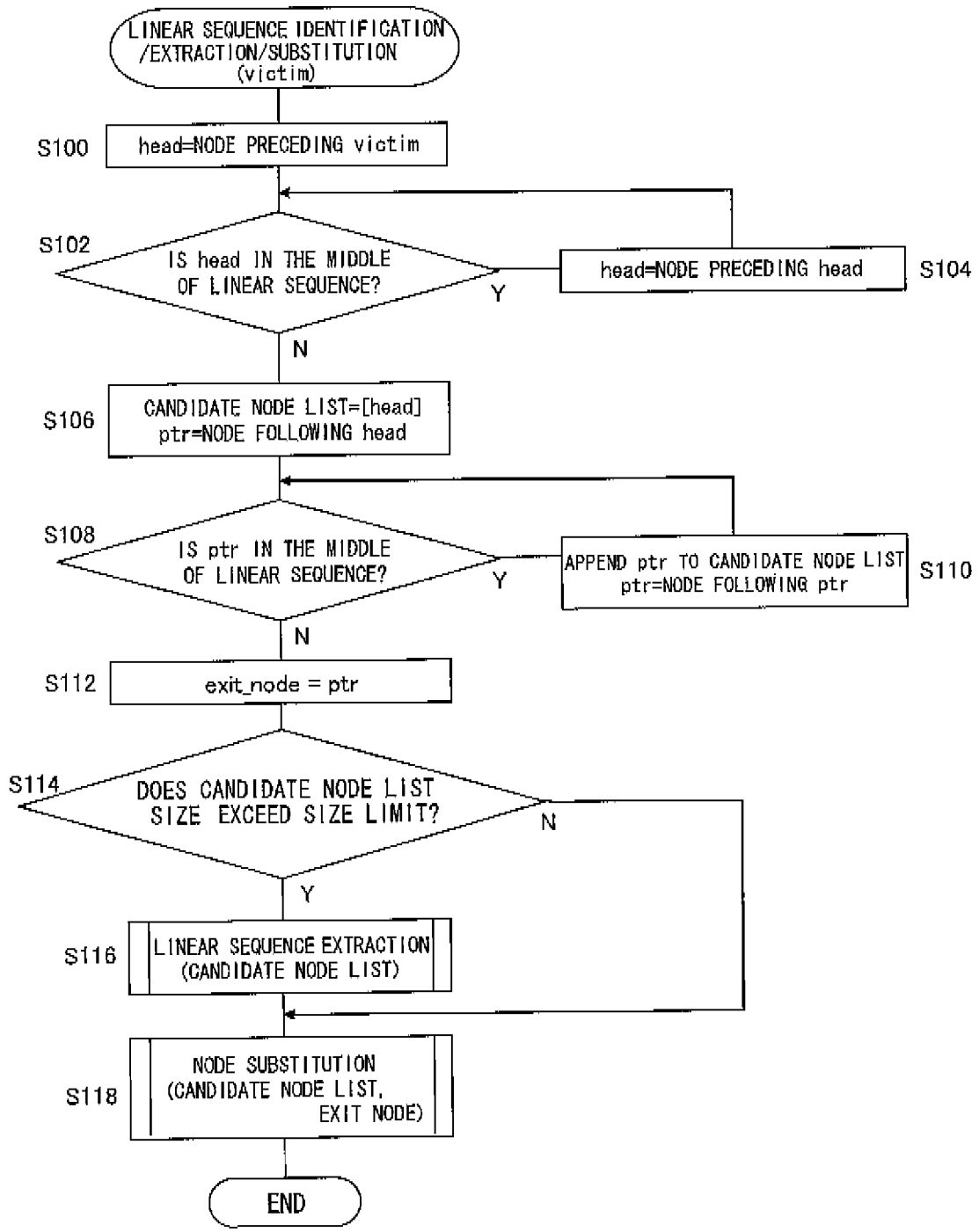
FIG. 11 is a flowchart showing a procedure of a function for identification, extraction, and substitution of a linear sequence according to the embodiment.

FIG. 11 shows a procedure of a function for identification, extraction, and substitution of a linear sequence called in S92 of FIG. 10. As described above, the function identifies a range of linear node sequence including the node designated by the argument. If the total size of the node array exceeds the size limit of a cache block, the function extracts a part and generates a new CFG. The function further substitutes a single new node for the entirety of the linear node sequence. The function is executed by the extractor 110 and the node substitution unit 112.

Since the node designated by the argument is one of the nodes included in the linear node sequence, the linear sequence including the node is identified. More specifically, the identification number of a node immediately preceding the node with the identification indicated in the argument by the variable "victim" is substituted into a variable "head" (S100). If the node indicated by the variable head is in the middle of the linear node sequence (Y in S102), the variable head is assigned the identification number of the node immediately preceding the node indicated by the previously occurring variable head (S104). Steps S102 and S104 are repeated so that the loop is exited when the node indicated by the variable head is no longer in the middle of the linear sequence (N in S102). Through these steps, the variable head is finally assigned the identification number of the node closest to the entry in the linear sequence.

The variable head is then substituted into a "candidate node list" array and the node that follows the node indicated by the variable head is substituted into a variable "ptr" (S106). If the node indicated by the variable ptr is in the middle of the linear node sequence (Y in S108), the value of the variable ptr is appended to the candidate node list and the variable ptr is assigned the identification number of the node following the node indicated by the previously occurring variable ptr (S110). Steps S108 and S110 are repeated so that the loop is exited when the node indicated by the variable ptr is no longer in the middle of the linear node sequence (N in S108). Through these steps, of the nodes forming the linear node sequence, the identification numbers of all nodes other than the last node are included in the candidate node list array and the variable ptr is finally assigned the identification number of the last node.

For subsequent steps, the value of the variable ptr is substituted into the variable exit_node (S112). A determination is made as to whether the total size of the nodes belonging to the candidate node list array exceeds the size limit of a cache block (S114). If the size limit is exceeded (Y in S114), the excess of size limit is eliminated by calling the function for linear sequence extraction whereby a part of the linear sequence of nodes is extracted, using the candidate node list array as an argument (S116). If the size limit is not exceeded (N in S114), or if the excess is eliminated by an extraction process (S116), the function for node substitution is called so as to substitute a new single node for the node belonging to the candidate node list array (S118).

Figure 12:
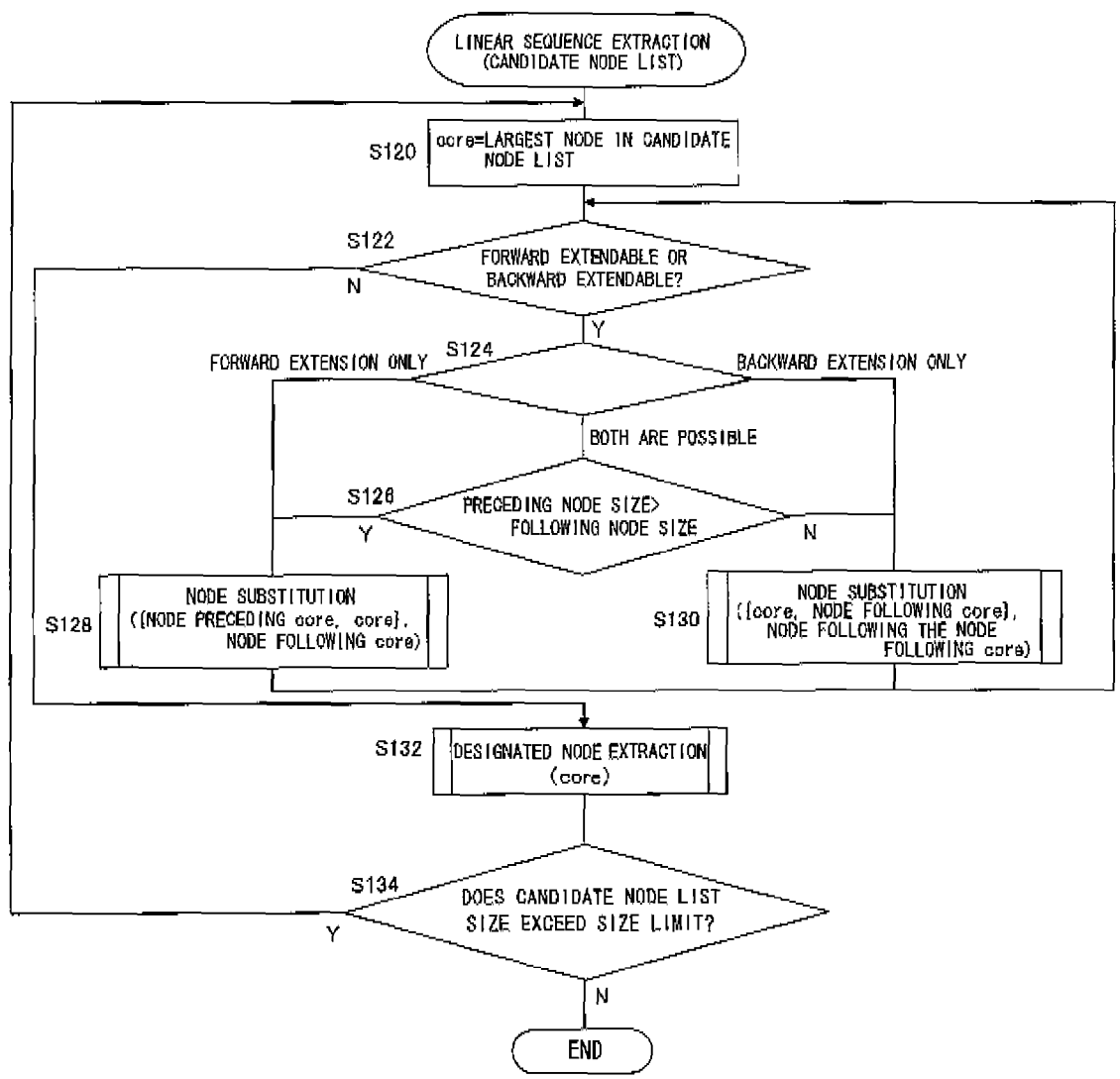
FIG. 12 is a flowchart showing a procedure of a function for linear sequence extraction according to the embodiment.

FIG. 12 shows a procedure of a function for linear sequence extraction called in S116 of FIG. 11. The function eliminates the excess of size limit of the linear node sequence by extracting a part of the linear node sequence identified in the process of FIG. 11, using the candidate node list array including the identification numbers of the nodes other than the last node as an argument, and by generating a new CFG. Since the target of extraction is a linear sequence, it is ensured that the extracted part is as large as possible within the size limit. This will reduce overhead resulting from small-sized cache blocks mentioned above. The function is executed by the extractor 110 and the node substitution unit 112.

The identification number of the node with the maximum size in the linear node sequence designated by the argument is substituted into a variable "core" (S120). Subsequently, a determination is made as to whether the range of extraction can be extended forward or backward, starting at the node indicated by the variable core (S122). The range can be extended forward on the condition that the node indicated by the variable core is not at the head of the node set designated by the candidate node list and that the total size of the node indicated by the variable core and the preceding node does not exceed the size limit of a cache block. The range can be extended backward on the condition that the node indicated by the variable core is not at the end of the node set designated by the candidate node list and that the total size of the node indicated by the variable core and the following node does not exceed the size limit of a cache block.

If forward extension only is possible (Y in S122, "forward extension only" in S124), the function for node substitution is called so that the node indicated by the variable core and the preceding node are turned into a single node (S128). If backward extension only is possible (Y in S122, "backward extension only" in S124), the function for node substitution is called so that the node indicated by the variable core and the following node are turned into a single node (S130). If both forward extension and backward extension are possible (Y in S122, "both are possible" in S124), and if the size of the preceding node is larger than that of the following node (Y in S126), the function for node substitution is called so that the node indicated by the variable core and the preceding node are turned into a single node (S128). If the size of the following node is larger (N in S126), the function for node substitution is called so that the node indicated by the variable core and the following node are turned into a single node (S130). In other words, the node indicated by the variable core and the larger of the preceding and following nodes are turned into a single node.

Steps S122, S124, S126, S128, and S130 are repeated until neither of forward extension and backward extension is possible. In this way, a block started at the node indicated by the variable core and having the maximum size is created within the size limit of a cache block and is turned into a single node. The function for node substitution substitutes the node identification number of the substituted single node into the value of the variable core. If neither of forward extension and backward extension is possible (N in S122), the function for designated node extraction is called, using the variable core indicating the identification number of substituted single node as an argument (S132). The function extracts the node and generates a new CFG.

Then a determination is made as to whether the total size of the nodes belonging to the candidate node list array still exceeds the size limit of a cache block (S134). In the extraction process described above, the original identification numbers of the nodes are allowed to remain after the node extraction. Instead, the lists of basic blocks included in the nodes or the instruction sequences included in the basic blocks are updated. Accordingly, the candidate node list array can continue to be used as an argument for determination as to whether the size limit is exceeded.

If the total size exceeds the size limit (Y in S134), of the nodes belonging to the candidate node list array, the identification number of the node with the maximum size at that point of time is substituted into the variable core. Thereupon, the steps as described above are repeated, i.e., a node sequence having the maximum size under the constraint of the size limit is turned into a single node and extracted (S120-S132). The above-described steps are repeated until the total size of the nodes designated in the candidate node list does not exceed the size limit (Y in S134, S120-S132). If the excess is eliminated (N in S134) the process is terminated.

Figure 13:
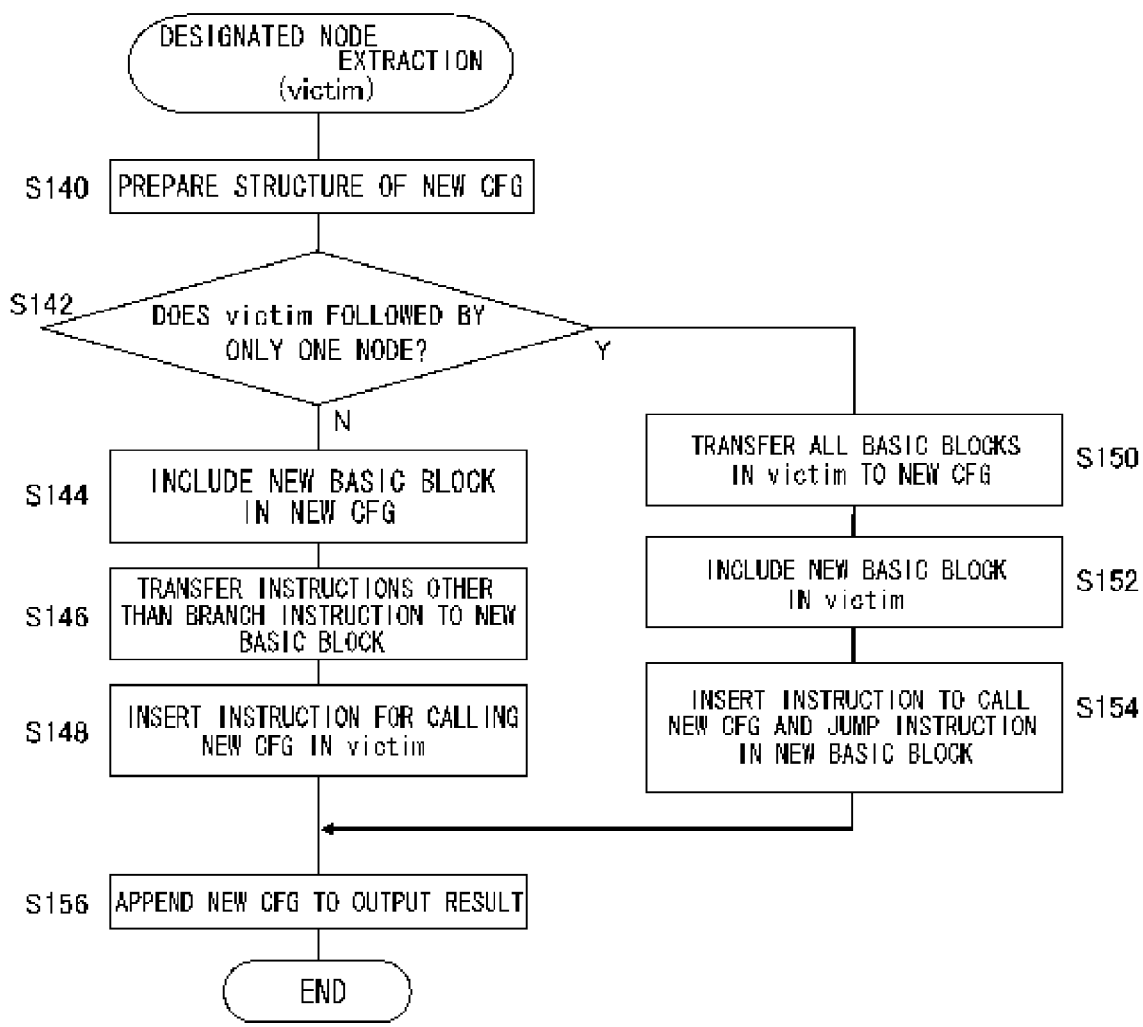
FIG. 13 is a flowchart showing a procedure of a function for designated node extraction according to the embodiment.

FIG. 13 shows a procedure of a function for designated node extraction called in S98 of FIG. 10 and S132 of FIG. 12. The function extracts the node designated by the argument and transfers the extracted node to a new CFG. The function is executed by the extractor 110. A structure of a new CFG is prepared (S140). A determination is made as to whether the number of nodes following the node designated by the argument is 1 or not (S142). If the node designated by the argument is a compilation of nodes compiled through previous steps, there should be only one node at the exit. Therefore, if the number of nodes is not 1, it means that the node designated by the argument is not a compilation of a plurality of basic blocks but a single basic block originally in existence. Further, if the number of nodes is not 1, it means that a branch instruction is included at the end of the designated node.

In this case (N in S142), the identification number of the new basic block is included in the structure of the new CFG (S144). Of the instruction sequences included in the original basic block corresponding to the designated node, instruction sequences other than the branch instruction are transferred to the new basic block as instruction sequences therefor (S146). This results in the basic block in the original CFG corresponding to the designated node lacking instruction sequences other than the branch instruction. Therefore, an instruction sequence for calling the new CFG is inserted immediately before the branch instruction (S148).

If the number of nodes following the designated node is 1, i.e., if a linear node sequence extends from the designated node at least to the next node (Y in S124), all of the basic blocks included in the designated node are transferred to the structure of the new CFG as new nodes (S150). This results in the designated node in the original CFG containing no basic blocks. The identification number of a new basic block is included in the designated node in the original CFG (S152). An instruction sequence for calling the new CFG and an instruction for jump to the following node are written in the new basic block (S154). The new CFG generated through S148 or S154 is appended to the output result (S156).

Figure 14:
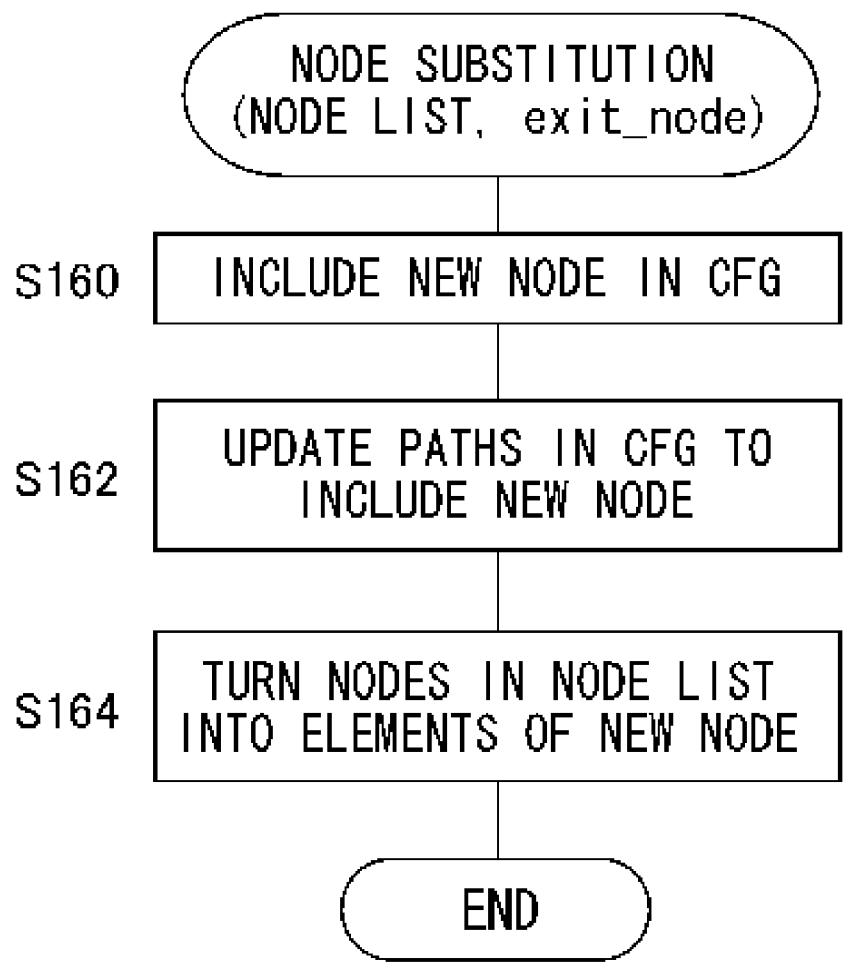
FIG. 14 is a flowchart showing a procedure of a function for node substitution according to the embodiment.

FIG. 14 shows a procedure of a function for node substitution called in S88 of FIG. 9, S118 of FIG. 11, and S128 and S130 of FIG. 12. The function substitutes a single node for nodes included in the "node list" array designated by the argument. The function is executed by the node substitution unit 112. The identification number of a new node is included in the CFG (S160). Information indicating the relative positions of nodes, i.e., connections between nodes, included in the structure of the CFG is then updated such that the nodes in the node list array designated as representing a path is replaced by the new node (S162). For example, the node that follows the node B3 is B5 in FIG. 5. The designation is updated so that the node B5' is designated. Subsequently, the lists of basic blocks in the nodes included in the node list array are compiled into a list of basic blocks in the new node so that the plurality of original nodes are turned into elements constituting the new node (S164).

As described, the embodiment generates a CFG from a function to compiled and identifies an atomic extractable subgraph where there is only one entry node and only one exit node. If the size of the extractable subgraph exceeds the size limit of a cache block, nodes to be extracted from the subgraph are identified. The nodes to be extracted are turned into a new CFG. An instruction for calling the new CFG is substituted into the original CFG. Ultimately, each object code is generated for each CFG as a cache block.

In this way, a part of a function is extracted as if it is a subroutine. It is thus ensured that function calls and return processes across cache blocks are closed within the confinement of an instruction sequence forming the extractable subgraph. As a result, management of function calls and returns is simplified and is executed easily using a link stack.

A linear node sequence is extracted in block within the size limit of a cache block. This will increase the chance of performing processes successively without changing the cache block referred to during the execution of a program, as compared to a case where there are a large number of small-sized cache blocks. As a result, overhead caused by function calls or return processes across cache blocks is reduced.

The above-described process can be performed automatically using a compiler. Accordingly, the load on programmers associated with, for example, setting a location of partition in a program or studying the structure of a program to promote high-speed access, is reduced. Since the known technology can be used to generate an original CFG, to generate cache blocks based on partitioned CFGs, etc., the cost for introduction is minimized.

Described above is an explanation of the present invention based on an embodiment. The embodiment is intended to be illustrative only and it will be obvious to those skilled in the art that various modifications to constituting elements and processes could be developed and that such modifications are also within the scope of the present invention.

For example, it may be ensured that a node including a call of a previously extracted node is not extracted as much as possible. This is to avoid a situation as much as possible where a function called across cache blocks calls another function across cache blocks, i.e., where a function call results in another function call across cache blocks.

In case function calls and return processes are managed by using the link stack shown in FIG. 3, it is desirable that the nesting level be not too deep considering the capacity of the link stack.

In order to achieve the desirable configuration, the extractor 110 counts the number of times that each of the basic blocks is extracted and stores the number in the memory 102 or a register (not shown). In determining a node that is a candidate for extraction in S96 of FIG. 10 or in S128 and S130 of FIG. 12, the number of times that each of the basic blocks included in a node is extracted is referred to so that a node that includes a basic block extracted a smaller number of times is identified as a candidate for extraction in preference to other nodes.

What is claimed is:

1. A compiler comprising:
    Processor and memory;
    a partitioning unit operative to partition an input program into cache blocks having a size within a predetermined size limit, wherein the partitioning unit comprises:
    a subgraph detector operative to identify, in a path representing an order of processing instruction sequences forming the input program, a subgraph including a sequence of instructions that includes only one instruction at an entry and only one instruction at an exit;
    and an extractor operative:
    (i) to extract, from the subgraph, an instruction sequence of a maximum total size within the size limit as a new cache block, (ii) to substitute the extracted instruction sequence in the subgraph with an instruction for calling the source instruction sequence in the new cache block, (iii) to repeat the extraction and substitution until a size of the subgraph becomes smaller than or equal to the size limit, (iv) to extract the subgraph from the input program, (v) to substitute the extracted subgraph in the input program with an instruction for calling the extracted subgraph, (vi) to determine that each instruction sequence extracted from the subgraph as a respective cache block, (vii) to determine that the subgraph remaining after extracting the instruction sequence(s) is a further cache block, and (viii) to determine that the input program remaining after extracting the subgraph is a still further cash block;
    (ix) to extract one or more of the nodes and generate a new control flow graph including the at least one basic block included in the one or more extracted nodes; and (x) to count a number of times that each basic block included in the program is extracted, and any of the nodes that include a basic block extracted a smaller number of times is given preference to other nodes for extraction that have been extracted a higher number of times;
    a code generator operative to generate respective object code for each cache block determined by the extractor of the partitioning unit.

2. The compiler according to claim 1, wherein the compiler further comprises a control flow graph generator operative to generate a control flow graph from the input program, the subgraph detector identifies a range in the subgraph, the range being defined by nodes each including at least one basic block forming the control flow graph.

3. The compiler according to claim 1, wherein of the subgraphs included in the program, the subgraph detector identifies an atomic subgraph that does not include another subgraph.

4. The compiler according to claim 2, wherein the extractor is operative to identify a range of linear node sequence included in the subgraph and extract a node set that is included in the range, continuous with a node selected from the nodes within the range, and of a maximum total size within the size limit.

5. The compiler according to claim 2, further comprising:
    a node substitution unit operative to substitute a single node for the subgraph identified by the subgraph detector and the range of linear node sequence identified by the extractor, wherein the subgraph detector is operative to further identify a subgraph in the control flow graph where substitution is performed by the node substitution unit.

6. A program partitioning method comprising:
    reading a program stored in a memory, and identifying, in a path representing an order of processing instruction sequences forming the program, a subgraph including a sequence of instructions that includes only one instruction at an entry and only one instruction at an exit;

an extraction operation configured to:
(i) to extract, from the subgraph, an instruction sequence of a maximum total size within the size limit as a new cache block, (ii) to substitute the extracted instruction sequence in the subgraph with an instruction for calling the source instruction sequence in the new cache block, (iii) to repeat the extraction and substitution until a size of the subgraph becomes smaller than or equal to the size limit, (iv) to extract the subgraph from the input program, (v) to substitute the extracted subgraph in the input program with an instruction for calling the extracted subgraph, (vi) to determine that each instruction sequence extracted from the subgraph as a respective cache block, (vii) to determine that the subgraph remaining after extracting the instruction sequence(s) is a further cache block, and (viii) to determine that the input program remaining after extracting the subgraph is a still further cash block;
(ix) to extract one or more of the nodes and generate a new control flow graph including the at least one basic block included in the one or more extracted nodes; and
(x) to count a number of times that each basic block included in the program is extracted, and any of the nodes that include a basic block extracted a smaller number of times is given preference to other nodes for extraction that have been extracted a higher number of times;

storing as program blocks, the program blocks extracted from the subgraph, the subgraph remaining after extracting the instruction sequences, and the program remaining after extracting the subgraph in the memory.

7. A non-transitory, computer readable storage medium containing a computer program, comprising:

a module operative to read a program from a memory;
a module operative to identify, in a path representing an order of processing instruction sequences forming the program, a subgraph including a sequence of instructions that includes only one instruction at an entry and only one instruction at an exit;
an extraction module configured:
(i) to extract, from the subgraph, an instruction sequence of a maximum total size within the size limit as a new cache block, (ii) to substitute the extracted instruction sequence in the subgraph with an instruction for calling the source instruction sequence in the new cache block, (iii) to repeat the extraction and substitution until a size of the subgraph becomes smaller than or equal to the size limit, (iv) to extract the subgraph from the input program, (v) to substitute the extracted subgraph in the input program with an instruction for calling the extracted subgraph, (vi) to determine that each instruction sequence extracted from the subgraph as a respective cache block, (vii) to determine that the subgraph remaining after extracting the instruction sequence(s) is a further cache block, and (viii) to determine that the input program remaining after extracting the subgraph is a still further cash block;
(ix) to extract one or more of the nodes and generate a new control flow graph including the at least one basic block included in the one or more extracted nodes; and (x) to count a number of times that each basic block included in the program is extracted, and any of the nodes that include a basic block extracted a smaller number of times is given preference to other nodes for extraction that have been extracted a higher number of times;
a module operative to store, as program blocks, the program blocks extracted from the subgraph, the subgraph remaining after extracting the instruction sequences, and the program remaining after extracting the subgraph in the memory.

* * * * *